(No Model.)
A. J. PARMETER.
PLOW ATTACHMENT.
No. 395,994. Patented Jan. 8, 1889.
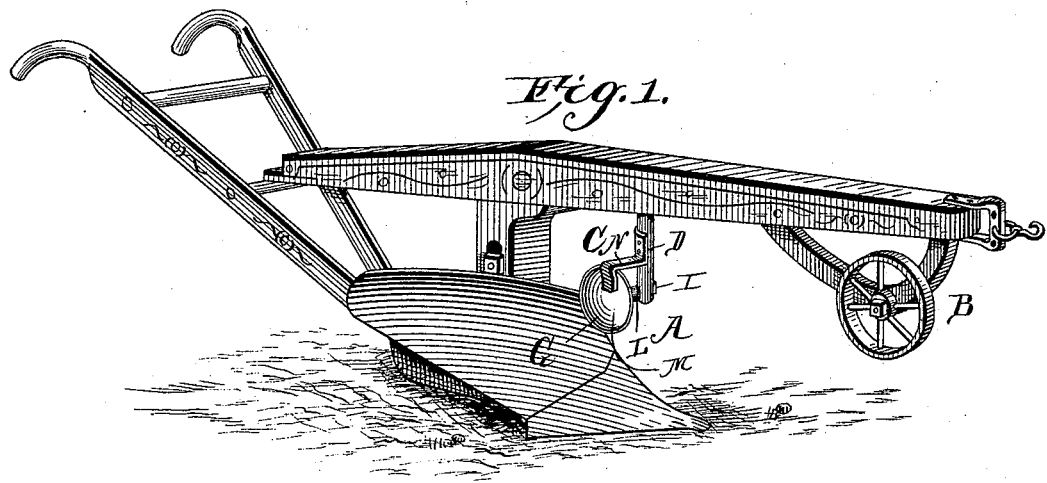
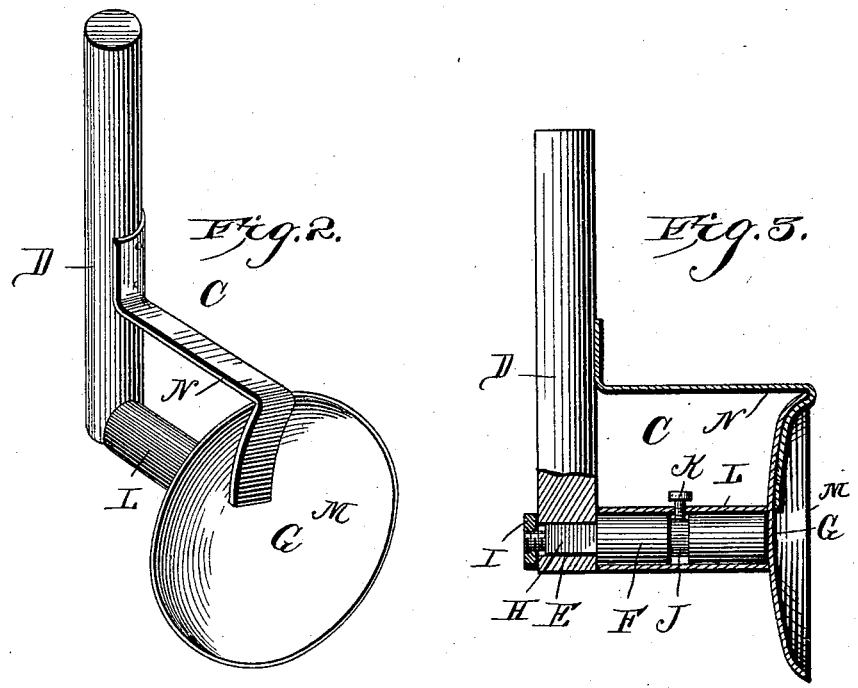
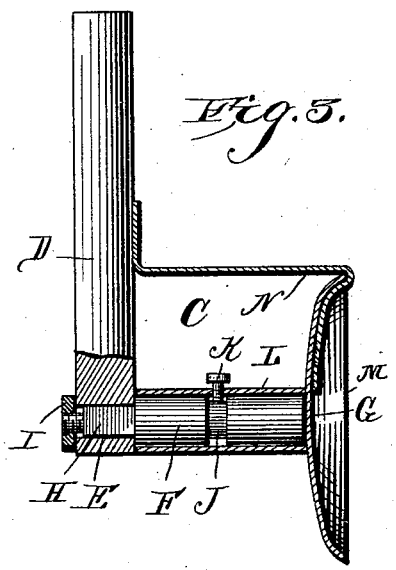
Witnesses
Henry G. Dieterich
R. J. Marshall
Inventor.
Addison J. Parmeter,
By his Attorneys

UNITED STATES PATENT OFFICE.

ADDISON JAMES PARMETER, OF FREDERICK, DAKOTA TERRITORY.

PLOW ATTACHMENT.

SPECIFICATION forming part of Letters Patent No. 395,994, dated January 8, 1889.

Application filed August 18, 1888. Serial No. 283,108. (No model.)

*To all whom it may concern:*

Be it known that I, ADDISON JAMES PARMETER, a citizen of the United States, residing at Frederick, in the county of Brown and Territory of Dakota, have invented a new and useful Improvement in Plow Attachments, of which the following is a specification.

My invention relates to improvements in plow attachments; and it consists in certain novel features, hereinafter described and claimed.

In the accompanying drawings, Figure 1 is a perspective view of a plow provided with my improved device. Fig. 2 is a detail perspective view of the device removed from the plow. Fig. 3 is a detail sectional view of the attachment.

Referring to the drawings by letter, A designates an ordinary turning-plow provided with a colter, B, of the usual or any preferred construction.

C designates my improved attachment, which is designed to turn the edge of the furrow in, so that all grasses, weeds, stubble, or other foul stuff will be deposited in the bottom of the furrow, instead of being thrown against the side of the furrow last plowed prior to the one the plow is turning.

My attachment consists of a standard, D, secured to the beam of the plow and depending therefrom and having an angular tapered transverse opening, E, in its lower end, an axle, F, mounted in said opening, and a rolling concave disk, G, carried by said axle. The axle is provided at one end with a tapered angular projection, H, which is inserted through the transverse opening in the lower end of the standard, and has a threaded cylindrical extremity which projects beyond the standard, and has a securing-nut, I, mounted thereon, which is adapted to be turned up against the standard to secure the axle therein. The axle is further provided at about its center with an annular groove, J, and a set-screw, K, mounted in the hub L of the rolling concave disk M, engages and plays in this groove to prevent the disk being removed accidentally when not in use.

The rolling disk M is secured to the front end of the hub, and its front face is concave and adapted to turn the earth and roots, foul weeds, &c., with the furrow and into the bottom of the furrow plowed prior to one that the plow is turning.

N designates a scraper, consisting of a plate having its rear end secured to the standard and its front end turned downward and bearing against the front face of the disk to clear the dirt therefrom.

In practice the earth-turning attachment is secured to the plow-beam in the rear of the colter and just over the share, (or can be placed in the place of the rolling colter,) so as to cut the edge of the furrow and at the same time throw the edge of the furrow in, so that all grasses, foul weeds, stubble, manure, &c., will be deposited in the bottom of the furrow plowed prior to the one that the plow is turning, thereby preventing the foul weeds and grass from growing to the surface so soon and prevent stubble, weeds, manure, &c., from catching in the drill, seeder, or harrow-teeth.

The device is very simple and efficient, and its advantages are thought to be obvious.

Having thus described my invention, what I claim, and desire to secure by Letters Patent, is—

As an improvement in plow attachments, the combination of the standard having its lower end provided with a transverse angular tapered opening, E, the cylindrical axle having an annular groove and provided with a reduced tapered angular projection inserted through the opening E and properly secured, the concave disk having a hollow cylindrical hub fitting on the cylindrical axle, the set-screw mounted in the hub and engaging the annular groove in the axle, and the scraper secured to the standard and bearing against the front concave face of the disk, as specified.

In testimony that I claim the foregoing as my own I have hereto affixed my signature in presence of two witnesses.

ADDISON JAMES PARMETER.

Witnesses:
GEORGE T. DOTY,
THOMAS H. FYLPAA.